United States Patent [19]

Loonam

[11] Patent Number: 4,916,794
[45] Date of Patent: Apr. 17, 1990

[54] METHOD OF AND APPARATUS FOR RECONDITIONING RAILWAY CAR DRAFT GEARS

[76] Inventor: Peter A. Loonam, 8805 Skyline Dr., Hinsdale, Ill. 60521

[21] Appl. No.: 260,101

[22] Filed: Oct. 20, 1988

Related U.S. Application Data

[62] Division of Ser. No. 146,667, Jan. 21, 1988, Pat. No. 4,809,419.

[51] Int. Cl.⁴ ................................................. B23P 6/00
[52] U.S. Cl. ............................... 29/402.04; 29/402.03
[58] Field of Search ............ 29/402.01, 402.03, 402.04, 29/402.08; 213/220, 221, 31, 32 C, 32 R, 32 B, 34, 32 A

[56] References Cited

U.S. PATENT DOCUMENTS

| | | | |
|---|---|---|---|
| 815,050 | 3/1906 | Tower | 213/31 |
| 2,229,442 | 1/1941 | Clark | 213/31 |
| 2,238,220 | 4/1941 | Gallagher | 213/31 |
| 2,383,265 | 8/1945 | Lehrman | 213/31 X |
| 2,858,030 | 10/1958 | Mulcahy | 213/32 B X |
| 4,304,397 | 12/1981 | Zanow | 213/32 R X |
| 4,305,514 | 12/1981 | Zanow et al. | 213/32 R X |
| 4,735,328 | 4/1988 | Carlstedt | 213/32 R X |

Primary Examiner—Joseph M. Gorski

[57] ABSTRACT

The present invention provides a method and apparatus for reconditioning a draft gear assembly friction clutch mechanism. The apparatus comprises a generally rectangular substantial flat plate member having at least one protuberance extending outwardly from one side of such plate member. The friction clutch mechanism reconditioning method includes the steps of removing each component of the friction clutch mechanism from an open end of the draft gear housing. Then engaging the plate member with an outer surface of one of the outer stationary plates of the friction clutch mechanism in a position such that the protuberance extends into a recess on the outer surface. Thereafter reassembling the friction clutch mechanism into the open end of the draft gear housing in a position such that an opposite surface of the plate member engages a portion of a wall surface of the housing.

9 Claims, 3 Drawing Sheets

METHOD OF AND APPARATUS FOR RECONDITIONING RAILWAY CAR DRAFT GEARS

This is a divisional of co-pending application Ser. No. 07/146,667 filed on Jan. 21, 1988 now U.S. Pat. No. 4,809,419.

FIELD OF THE INVENTION

The present invention relates, in general, to friction clutch mechanisms of draft gear assemblies which absorb the shock encountered in railway cars during operation of such railway cars and, more particularly, this invention relates to a method of and an apparatus for restoring a useful capacity to a worn clutch mechanism of a draft gear assembly.

BACKGROUND OF THE INVENTION

In the railroad industry, it is common practice to use draft gear assemblies to minimize damage to the rolling equipment and/or to the lading on such equipment. These draft gear assemblies absorb the shocks which are encountered by the equipment during normal operation of a train. The friction clutch portions of these draft gear assemblies are subjected to substantial wear due to the sliding friction between the various moving components while such components are under a rather substantial load. When the wear on these components reaches a predetermined critical amount, the draft gear assembly must be removed from the railway car and replaced. The replacement draft gear assembly may be either a new draft gear assembly or a reconditioned draft gear assembly. In any event, failure to replace a worn draft gear assembly can result in rather significant and usually unnecessary damage to both the rolling equipment and to the lading on such equipment. Obviously, in view of the relatively substantial cost savings, it is desirable to recondition such worn draft gear friction clutch mechanisms where possible. It is also obvious that damage to the rolling equipment and/or lading on such equipment cannot be tolerated.

In one draft gear assembly which, at the present time, is in widespread use in the railroad industry, the friction clutch mechanism disposed in an open end of the housing of such draft gear assembly consists of a pair of outer stationary plates, a pair of movable plates, a pair of tapered stationary plates, a pair of wedge shoes, and a center wedge member. In an assembled relationship, this friction clutch mechanism has one of this outer stationary plates positioned in a recess located on each opposite side of the draft gear housing. One of the movable plates is positioned for sliding movement adjacent each outer stationary plate. Positioned adjacent each of the movable plates on an opposite side thereof is a tapered stationary plate. One of the wedge shoes is located adjacent each tapered stationary plate on an opposite side thereof and, finally, the center wedge is located intermediate the pair of wedge shoes to impart forces to such friction clutch mechanism during closure of the draft gear assembly.

The present manufacturer of this particular draft gear, Cardwell Westinghouse Division of American Standard Inc., has developed a rather useful inspection procedure for the friction clutch mechanisms of these draft gear assemblies to determine when replacement of at least some of the friction clutch components is necessary. According to this inspection procedure, all of the draft gear assemblies have a built-in "wear life gauge". This wear life gauge is known in the draft gear art as "plate clearance", which can either be observed by looking up at the draft gear assembly while it is still on the railway car or, if the assembly is out of the car, a straight edge can be placed along the center wedge of the draft gear. In this manner, a measurement of the "plate clearance" between the follower plate (straight edge) and the movable plates can be achieved in a relatively easy fashion. However, prior to making this measurement, it is recommended according to this inspection procedure, that each of the movable plates be driven or forced inwardly until the friction clutch mechanism becomes solid. The plate clearance is then an acceptable indicator of the total surface wear of the individual friction clutch components. In this inspection procedure, when the average plate clearance visible between the follower plate or straight edge and the movable plates exceeds one-eighth of an inch the remaining wear life of the draft gear assembly is still within acceptable tolerances. On the other hand, if this plate clearance is less than one-eighth of an inch, the draft gear assembly should be replaced to prevent equipment damage.

Prior to the development of the method and apparatus of the present invention, when it would become necessary to recondition a friction clutch mechanism of a draft gear assembly, such reconditioning would involve the replacement of certain friction clutch parts with new ones to bring the plate clearance back to a normal or to at least an acceptable level. Generally, these new replacement parts consisted of a pair of tapered stationary plates. The replacement tapered stationary plates are usually about one-sixteenth of an inch greater in thickness than the original equipment ones. For this reason, the replacement pair of tapered stationary plates are more costly, and this added cost must be passed on to the consumer in the form of higher prices.

SUMMARY OF THE INVENTION

The present invention provides an apparatus for use in reconditioning a worn friction clutch mechanism of a railway car draft gear assembly to restore such draft gear assembly to a useable capacity. The friction clutch restoration apparatus comprises a generally rectangular-shaped and substantially flat plate member. Such flat plate member has a length, a width, and a thickness which are all predetermined. On one side of this plate member, there is at least one protuberance provided. This protuberance is located in a predetermined position with respect to a preselected corner of the plate member. The at least one protuberance extends outwardly from a first surface of such one side of the plate member for a predetermined distance. Furthermore, this protuberance has a predetermined diameter.

Also encompassed by the present invention is a procedure for reconditioning a worn friction clutch mechanism of a railway car draft gear assembly to restore such friction clutch mechanism to a useable capacity. This method of restoring such useable capacity to the worn friction clutch mechanism includes the following steps. Each individual friction clutch component forming a portion of such draft gear friction clutch mechanism is first removed from an open end of the housing member of the draft gear assembly. Thereafter, a first surface of a generally rectangular-shaped and substantially flat plate member having at least one protuberance extending outwardly from such first surface is engaged with an outer surface of at least one of the pair of outer stationary plates of such friction clutch mechanism. This flat plate member is engaged with the at least one outer stationary plate in a position such that the at least one outwardly-extending protuberance extends into a recess located in the outer surface of the at least one outer stationary plate. At this point, reassembly of each individual friction clutch component forming a portion of the friction clutch mechanism into the open end of the housing member of he draft gear assembly can be accomplished. Such reassembly of the friction clutch mechanism is performed in a manner such that a second surface of the substantially flat plate member, which is axially-opposite the first surface of the flat plate member, is in abutting engagement with a wall surface adjacent the open end of the draft gear assembly housing member.

OBJECTS OF THE INVENTION

It is, therefore, one of the primary objects of the present invention to provide a method of and an apparatus for the reconditioning of a worn friction clutch mechanism of a railway car draft gear assembly which will result in a reconditioned draft gear assembly, which will exhibit a draft gear capacity that is comparable to those draft gear assemblies which have been reconditioned by replacement of certain worn friction clutch components with new oversized components.

Another object of the present invention is to provide a method of and an apparatus for the reconditioning of a worn friction clutch mechanism of a railway car draft gear assembly which will provide a generally lower overall cost associated with such reconditioning of the friction clutch mechanism of such draft gear assembly.

A further object of the present invention is to provide an apparatus for the reconditioning of a friction clutch mechanism of a railway car draft gear assembly in which such apparatus can be easily maintained in position during the reassembly of the other friction clutch components of the friction clutch mechanism.

Another object of the present invention is to provide an apparatus for the reconditioning of the friction clutch mechanism of a railway car draft gear assembly which, after installation and during operation on a train, the apparatus will be restrained from movement from its desired position, thereby preventing a concentrated load on such reconditioning apparatus, which might cause peening and/or extruding of such apparatus.

Still another object of the present invention is to provide a method of and an apparatus for the reconditioning of the friction clutch mechanism of a railway car draft gear assembly in which such method and apparatus can be utilized on a number of different types of draft gear assemblies without substantial modifications.

Yet a further object of the present invention is to provide a method of and an apparatus for the reconditioning of the friction clutch mechanism of a railway car draft gear assembly which can be used for at least two such reconditionings of such friction clutch mechanism and wherein such two reconditionings can be achieved without the necessity of replacing any of the original equipment friction clutch components.

In addition to the above-described objects and advantages of the present invention, it is believed that various other objects and advantages of the method of and apparatus for reconditioning a worn friction clutch mechanism of a railway car draft gear assembly will become more readily apparent to those persons skilled in the railroad draft gear art from the following more detailed description of the invention, when such description is taken in conjunction with the attached drawings and with the appended claims.

BRIEF DESCRIPTION OF THE INVENTION

Figure 1:
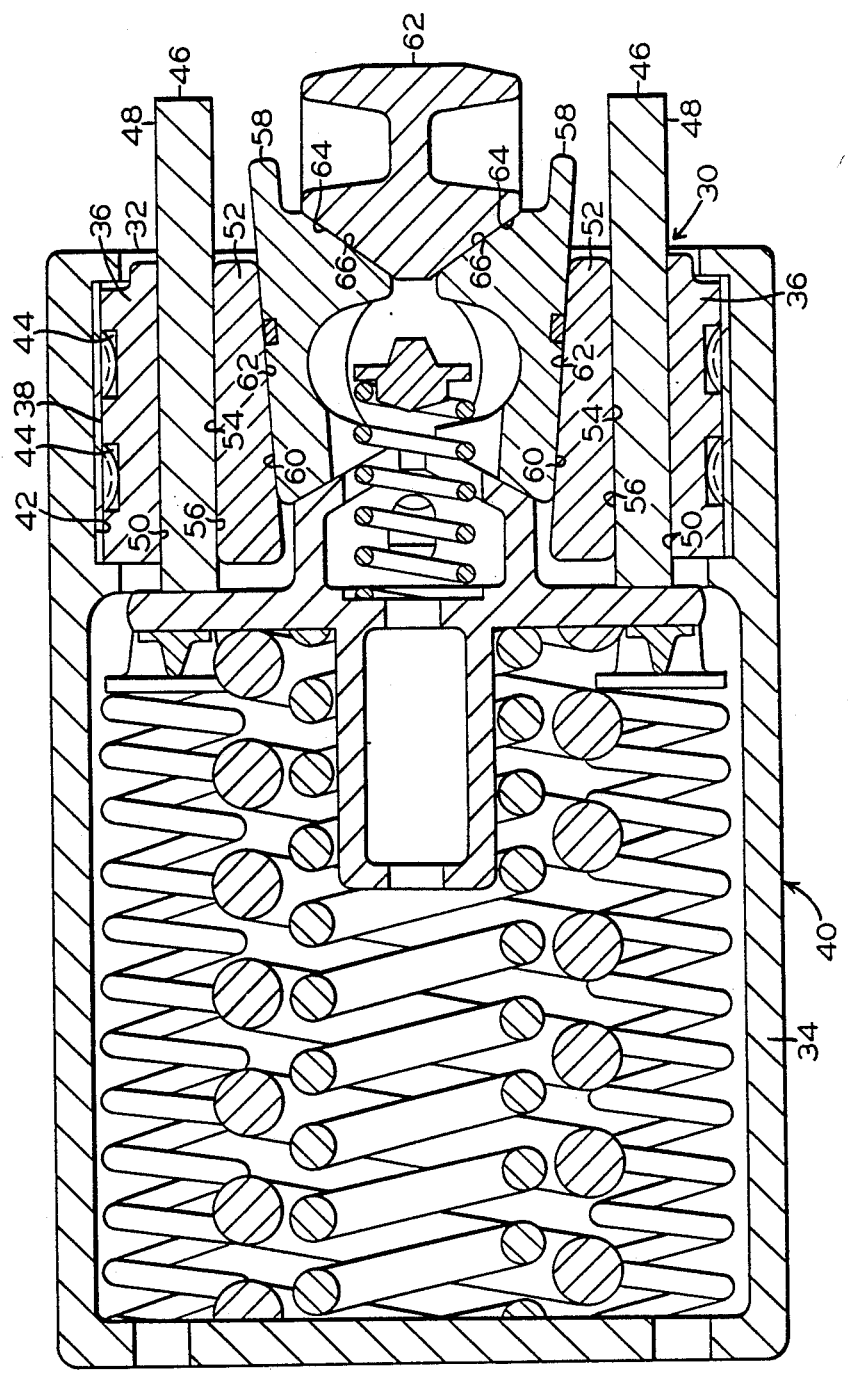
FIG. 1 is a side elevational view that is partially in cross-section of one type of draft gear assembly which has incorporated therein a presently preferred embodiment of the apparatus of the present invention to recondition to a useable capacity the friction clutch mechanism of such draft gear assembly.

Prior to proceeding to the more detailed description of the various embodiments of the present invention, it should be noted that throughout the several views of the drawings identical components have been identified with identical reference numerals for the sake of clarity.

Figure 3:
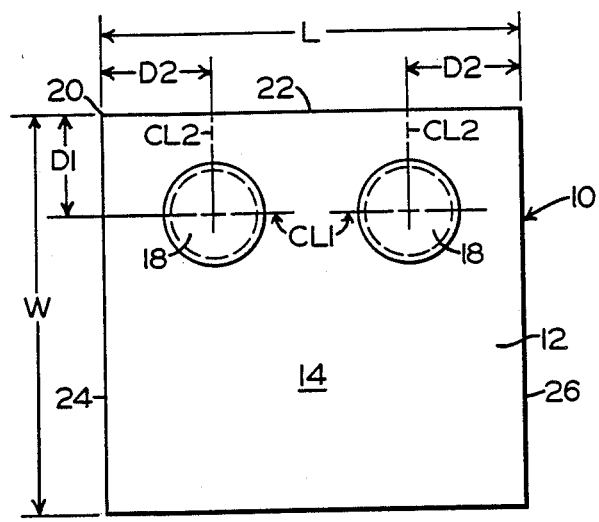
FIG. 3 is a plan view of a presently referred embodiment of the apparatus of the present invention to recondition to a useable capacity the friction clutch mechanism of a railway car draft gear assembly.
Figure 4:
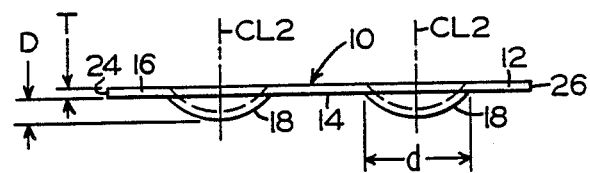
FIG. 4 is a side view of the draft gear friction clutch mechanism reconditioning apparatus illustrated in FIG. 3.

Attention is now directed, more particularly, to FIGS. 3 and 4, which illustrate a presently preferred embodiment of the draft gear friction clutch mechanism reconditioning apparatus, generally designated 10, of the present invention. As shown therein, the reconditioning apparatus 10 includes a generally rectangular-shaped and substantially flat plate member 12. This substantially flat plate member 12 has both a predetermined length L and a predetermined width W. The thickness T of the flat plate member 12 is also predetermined. As will become clear in the description, which follows, the thickness T will be governed by two primary factors. One primary factor is whether or not a pair of these plate members 12 will be used in the reconditioning of the friction clutch mechanism of the draft gear assembly. A second primary factor is whether or not this is the first or the second time the friction clutch mechanism of the draft gear assembly has been reconditioned. Although the reconditioning apparatus 10 of the present invention might be used to recondition the friction clutch mechanism of a draft gear assembly a third time, by increasing the thickness T of the flat plate member 12, this practice would generally not be recommended.

According to the presently preferred embodiment of this invention, a first surface 14 and a second surface 16 of the substantially flat plate member 12 will be flat to within about plus or minus 0.005 inch of 0.030 inch. It is more preferred that the flat plate member 12 will be flat to within about plus or minus 0.002 inch of 0.030 inch. It is most preferred that the flat plate member 12 be flat to within about 0.030 inch. The second surface 16 of the flat plate member 12 is disposed axially opposite the first surface 14. Further, in this presently preferred embodiment of the invention being described, the predetermined length L of the flat plate member 12 will generally be between about 4.15 inches and about 4.35 inches, while the predetermined width W of such flat plate member 12 will generally be between about 3.90 inches and about 4.10 inches. It is more preferred that the predetermined length L of the flat plate member 12 will be between about 4.20 inches and about 4.30 inches, while the predetermined width W of such flat plate member 12 will be between about 3.95 inches and 4.05 inches. In the most preferred embodiment, the flat plate member 12 will normally have a predetermined length L of about 4.25 inches and a predetermined width W of about 4.00 inches.

As mentioned above, the predetermined thickness T of the flat plate member 12 in the presently preferred embodiment of the invention will be governed by a number of factors. For example, consider the case in which only one substantially flat plate member 12 will be used to recondition a worn friction clutch mechanism of the draft gear assembly, and that this is the first time such friction clutch mechanism is reconditioned. In this case, the predetermined thickness T of the flat plate member 12 will generally be between about three-thirtyseconds of an inch and about five-thirtyseconds of an inch, with the most preferred thickness T being about one-eighth inch. Now, consider the case in which a pair of substantially flat plate members 12 are used in a first reconditioning of a worn friction clutch mechanism of a draft gear assembly. In this case, each of the substantially flat plate members 12 will have a thickness T of generally about one-sixteenth of an inch.

Next, consider the case where a second reconditioning of a worn friction clutch mechanism of a draft gear assembly using a pair of substantially flat plate members 12 is performed. In this case, the predetermined thickness T of each of the flat plate members 12 will also generally be between about three-thirtyseconds of an inch and about five-thirtyseconds of an inch, with the most preferred thickness T being about one-eighth of an inch.

The worn friction clutch mechanism restoration apparatus 10 of the present invention will also include at least one protuberance 18. The protuberance 18 extends outwardly from the first surface 14 of the flat plate member 12. This protuberance 18 is located in a predetermined position with respect to one preselected corner 20 of the flat plate member 12. In this embodiment, the protuberance 18 extends outwardly from the first surface 14 of the flat plate member 12 for a predetermined distance D. In addition, the protuberance 18 has a predetermined diameter d.

In the presently preferred embodiment of this invention, the worn friction clutch mechanism restoration apparatus 10 will include a pair of protuberances 18. In this case, a first centerline CL1 of each of such protuberances 18 will be located at a substantially equal distance D1 from an identical edge 22 of the flat plate member 12. Each of the pair of protuberances 18 includes a second centerline CL2 that is located substantially perpendicular to the first centerline CL1. The second centerline CL2 of each of the protuberances 18 is substantially an equal distance D2 from a respective opposite edge 24 and 26 of the substantially flat plate member 12. Preferably, each of the respective opposite edges 24 and 26 is substantially perpendicular to the identical edge 22 of the flat plate member 12.

According to the most preferred embodiment of the worn friction clutch mechanism restoration apparatus 10 of this invention, each of such pair of protuberances 18 is formed integral with the flat plate member 12. This can be accomplished by metal displacement in a die punch operation, for example, as is known in the art. As one acceptable alternative, each of the pair of protuberances 18 could be formed satisfactorily on the flat plate member 12 by other known procedures, such as, by welding. Although, in view of the higher cost, this method of forming the pair of protuberances 18 on the flat plate member 12 is generally not preferred.

In the embodiment of the invention which has been illustrated in FIGS. 3 and 4 of the drawings, the predetermined distance D that each of the pair of protuberances 18 extends outwardly from the first surface 14 of the one side of such substantially flat plate member 12 is preferably between about 0.178 inch to about 0.198 inch. It is more preferred that this predetermined distance D will be generally between about 0.186 inch to about 0.190 inch. It is most preferred that this predetermined distance D be generally about 0.188 inch. Additionally, in the presently preferred embodiment of the invention, the diameter d of each of the pair of protuberances 18 will generally be between about 0.90 inch and about 1.10 inches. It is more preferred that this predetermined diameter d will fall between about 0.98 inch and about 1.02 inches. It is most preferred that this diameter d be generally about 1.00 inch. At present, it is preferred that the substantially equal distance D1 of the first centerline CL1 of each of the pair of protuberances 18 will be between about 1.03 inches and about 1.23 inches. Preferably, this distance D1 will be generally between about 1.10 inches and about 1.15 inches. It is most preferred that the distance D1 generally be about 1.13 inches. Finally, in the presently preferred embodiment of the worn friction clutch mechanism reconditioning apparatus 10, the second centerline CL2, which is substantially perpendicular to the first centerline CL1, of each of the pair of protuberances 18 from a respective opposite edge 24 and 26 of the flat plate member 12 will usually fall at a distance D2 of between about 0.90 inch and about 1.10 inches from such respective opposite edge 24 and 26. It is even more preferred that the distance D2 be generally between about 0.98 inch and about 1.02 inches from each such respective opposite edge 24 and 26. It is most preferred that this distance D2 will generally be about 1.00 inch from each respective opposite edge 24 and 26.

Figure 2:
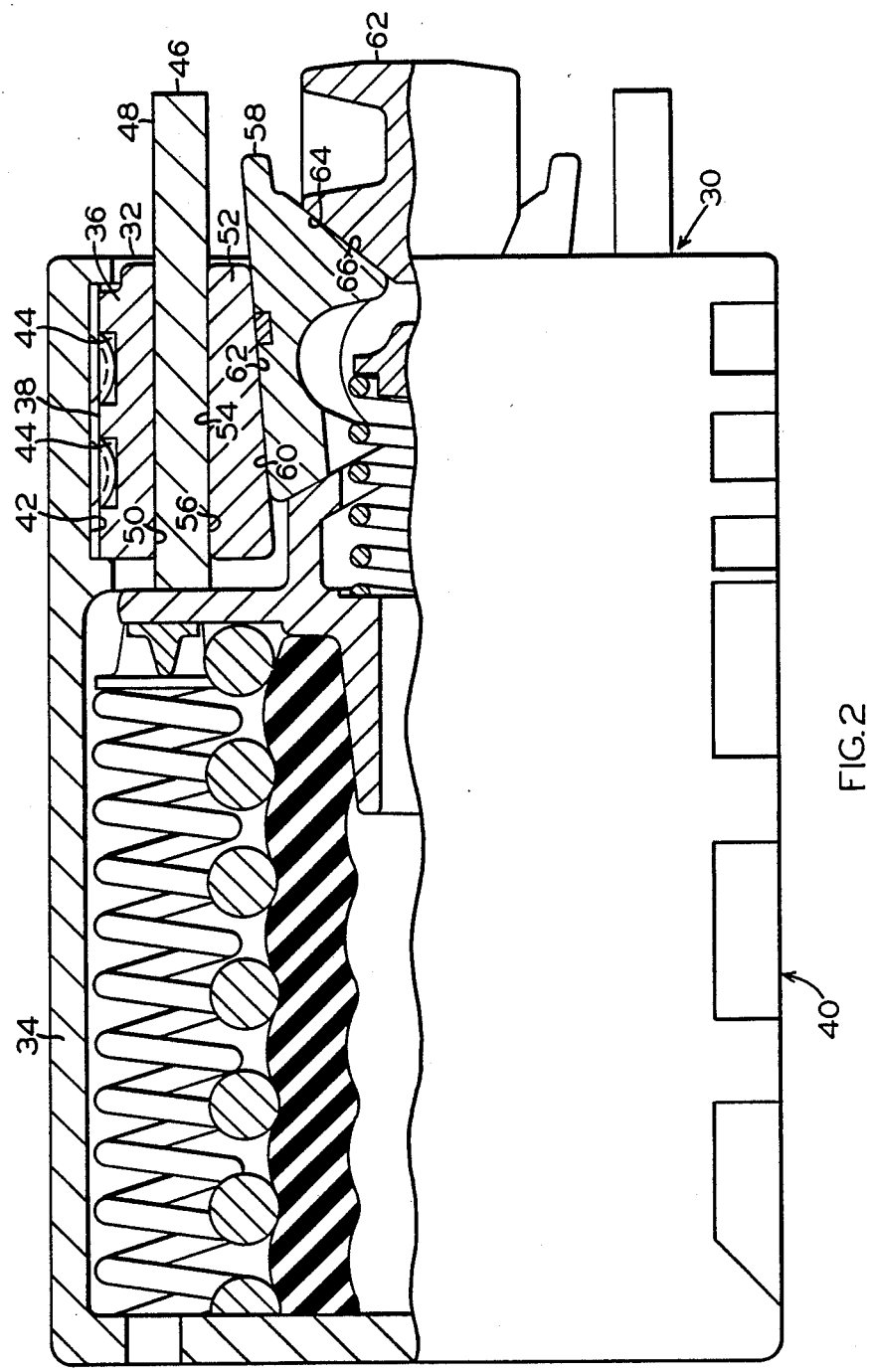
FIG. 2 is a side elevational view that is partially in cross-section of another type of draft gear assembly which can also have incorporated therein the presently preferred embodiment of the apparatus of the present invention to recondition to a useable capacity the friction clutch mechanism of such draft gear assembly.

Now reference is made more particularly to FIGS. 1 and 2 of the drawings, which illustrate the intended use of the reconditioning apparatus 10 in a method of restoring a useable capacity to a worn friction clutch mechanism, generally designated 30, of a railway car (not shown) draft gear assembly, generally designated 40. In each of the draft gear assemblies 40 illustrated, the friction clutch mechanism 30 is positioned in an open end 32 of a housing member 34. Each of the friction clutch mechanisms 30 illustrated includes a number of friction clutch components. A first of these friction clutch components of the friction clutch mechanism 30 is a pair of outer stationary plates 36. Each of the outer stationary plates 36 has an outer surface 38 positioned adjacent a side wall 42 of the housing member 34. A plurality of recesses 44 are located in the outer surface 38 of each of the outer stationary plates 36. A second of these friction clutch components of the friction clutch mechanism 30 is a pair of movable plates 46. An outer surface 48 of each of the movable plates 46 is frictionally-engaged with an inner surface 50 of a respective outer stationary plate 36. A third of these friction clutch components of the friction clutch mechanism 30 is a pair of tapered stationary plates 52. An outer surface 54 of each of the tapered stationary plates 52 frictionally-engages an inner surface 56 of a respective movable plate 46. A fourth of these friction clutch components of the friction clutch mechanism 30 is a pair of wedge shoes 58. An outer surface 60 of each of the a wedge shoes 58 frictionally-engages an inner surface 56 of a respective tapered stationary plate 52. The fifth and final of these friction clutch components of the friction clutch mechanism 30 is a center wedge member 62. The center wedge member 62 has a pair of wedge surfaces 64, which frictionally-engage a respective friction surface 66 on each of the wedge shoes 58. Each of the above-mentioned frictionally-engaging surfaces are wear points in the friction clutch mechanism 30. When these friction surfaces have been worn away, the draft gear assembly 40 must be taken out of service and the friction clutch mechanism 30 reconditioned to restore it to a useable capacity.

According to the present invention, in the case where only one plate member 12 is used in the method of reconditioning a worn friction clutch mechanism 30 of a railway car draft gear assembly 40 to restore such worn friction clutch mechanism 30 to a useable capacity, as in the case of a first reconditioning of the friction clutch mechanism 30, the invented method includes the steps of first removing each of the individual friction clutch components, which form a portion of the overall friction clutch mechanism 30, from an open end 32 of the housing member 34 of the draft gear assembly 40. Once the friction clutch mechanism 30 has been removed, the second step of the method involves engaging a first surface 14 of an at least one substantially flat plate member 12, which has at least one protuberance 18 extending outwardly from such first surface 14, with an outer surface 38 of at least one of the outer stationary plates 36 of such friction clutch mechanism 30. The flat plate member 12 is engaged with the at least one outer stationary plate 36 in a position such that the at least one protuberance 18 extends into a cavity 44 located in the outer surface 38 of such at least one outer stationary plate 36. The final essential step in the method of reconditioning the friction clutch mechanism 30 involves the step of reassembling each of the individual friction clutch components forming such friction clutch mechanism 30 into the open end 32 of the housing member 34 of the draft gear assembly 40. This reassembly is performed in a manner such that a second surface 16 of the at least one flat plate member 12 will be in abutting engagement with a portion of a wall surface 42 of the housing member 34 adjacent an open end 32 thereof. The second surface 16 of the at least one flat plate member 12 is disposed axially-opposite the first surface 14 of such at least one flat plate member 12.

In the presently preferred embodiment of the invention, the worn friction clutch mechanism 30 reconditioning method includes the additional step of examining the at least one outer stationary plate 36 for defects prior to engaging the first surface 14 of the at least one flat plate member 12 with the outer surface 38 of such at least one outer stationary plate 36.

It is additionally preferred that at least prior to reassembly of the individual friction clutch components into the open end 32 of the housing member 34, that the method include the step of examining each individual friction clutch component for defects.

The method also includes the step of replacing any individual friction clutch component of the friction clutch mechanism 30 which, during examination, is found to be defective. The presently preferred method also includes the additional step of cleaning the at least one outer stationary plate 36 prior to engaging the first surface 14 of the at least one flat plate member 12 with the outer surface 38 of such east one outer stationary plate 36. More preferably, the method includes the additional step of cleaning each individual friction clutch component at least prior to the reassembly step.

Now, turning to the case where a pair of flat plate members 12 are used in the reconditioning of a worn friction clutch mechanism 30, as would at least be the case where such friction clutch mechanism 30 is being reconditioned for the second time, the method includes the additional step of engaging a first surface 14 of a second flat plate member 12, which has at least one protuberance 18 extending outwardly from such first surface 14, with an outer surface 38 of a second outer stationary plate 36 of the friction clutch mechanism 30. Such first surface 14 of the second flat plate member 12 engages such outer surface 38 of the second outer stationary plate 36 in a position such that the at least one protuberance 18 extends into a cavity 44 located in such outer surface 38 of the second outer stationary plate 36. Also, in this case, the reassembly step includes the step of placing into abutting engagement a second surface 16 of the second flat plate member 12, which second surface 16 is axially opposite the first surface 14, with a portion of a second wall surface 42 of the housing member 34 adjacent the open end 32. The portion of the second wall surface 42 of the housing member 34 is disposed axially opposite the portion of the first wall surface 42 of such housing member 34.

In each of the various embodiments described, the predetermined thickness T of the flat plate member 12 will generally be between about 0.031 inch and about 0.156 inch. For example, when the reconditioning of such worn friction clutch mechanism 30 is an initial reconditioning and only one flat plate member 12 is to be used in such reconditioning, then the predetermined thickness T of the flat plate member 12 will generally be between about 0.094 inch and about 0.156 inch. In this case, it is more preferred that such predetermined thickness T of the plate member 12 be between about 0.120 inch and about 0.130 inch. These thicknesses T would also be the thickness of the flat plate member 12 in the situation where the worn clutch mechanism is being reconditioned for a second time. In this case, each of a pair of flat plate members 12 would have this thickness T.

On the other hand, in the case where a pair of flat plate members 12 are to be used to make an initial reconditioning of a worn clutch mechanism 30 of a draft gear assembly 40, the flat plate member 12 thickness T will fall between about 0.031 inch and about 0.094 inch. A more preferred range for the thickness T of the flat plate member 12 in this case is between about 0.060 inch and about 0.070 inch.

Finally, the method contemplates, prior to shipping, the additional step of testing the useable capacity of a reconditioned friction clutch mechanism 30 of the draft gear assembly 40.

While there are a number of embodiments described in detail above of the method of and apparatus for reconditioning a worn friction clutch mechanism of a railway car draft gear assembly to restore such draft gear assembly to a useable capacity it should be obvious, to those persons who are skilled in the railway draft gear art, that other modifications and adaptations of the present invention can be made with respect to both the method and the apparatus without essentially departing from the spirit and scope of the appended claims.

I claim:

1. A method of reconditioning a worn friction clutch mechanism of a railway car draft gear assembly to restore said worn friction clutch mechanism to a useable capacity, said method including the steps of:
   (a) removing each individual friction clutch component forming a part of said friction clutch mechanism from an open end of a housing member of said draft gear assembly, said friction clutch mechanism including a pair of outer stationary plates, at least one of said stationary plates including at least one cavity formed therein on an outer surface thereof, with said outer surface facing a portion of a wall surface of said housing member;
   (b) engaging a first surface of an at least one substantially flat plate member having at least one protuberance extending outwardly from said first surface with said outer surface of at least one of said pair of said outer stationary plates of said friction clutch mechanism in a position such that said at least one protuberance extends into said cavity located in said outer surface of said at least one of said pair of said outer stationary plates; and
   (c) reassembling said each individual friction clutch component forming said part of said friction clutch mechanism into said open end of said housing member of said draft gear assembly such that a second surface of said at least one flat plate member is in abutting engagement with said portion of said wall surface of said housing member adjacent said open end.

2. A method of reconditioning a worn friction clutch mechanism of a railway car draft gear assembly, according to claim 1, wherein prior to step (b) said method includes the additional step of examining said at least one of said pair of said outer stationary plates for defects.

3. A method of reconditioning a worn friction clutch mechanism of a railway car draft gear assembly, according to claim 2, wherein at least prior to step (c) said method includes the additional step of examining each remaining said individual friction clutch component for defects.

4. A method of reconditioning a worn friction clutch mechanism of a railway car draft gear assembly, according to claim 3, wherein said method includes the additional step of replacing any said individual friction clutch component of said friction clutch mechanism found defective.

5. A method of reconditioning a worn friction clutch mechanism of a railway car draft gear assembly, according to claim 1, wherein prior to step (b) said method includes the additional step of cleaning said at least one of said pair of said outer stationary plates.

6. A method of reconditioning a worn friction clutch mechanism of a railway car draft gear assembly, according to claim 5, wherein at least prior to step (c) said method includes the additional step of cleaning each remaining said individual friction clutch component.

7. A method of reconditioning a worn friction clutch mechanism of a railway car draft gear assembly, according to claim 1, wherein said method includes the additional step of testing said useable capacity of a reconditioned draft gear assembly prior to shipping.

8. A method of reconditioning a worn friction clutch mechanism of a railway car draft gear assembly, according to claim 1, wherein each of said pair of said outer stationary plates includes a cavity formed therein on an outer surface thereof, said method includes the additional step of engaging a first surface of a second substantially flat plate member, having at least one protuberance extending outwardly from said first surface, with an outer surface of a second of said pair of said outer stationary plates of said friction clutch mechanism in a position such that said at least one protuberance of said second plate member extends into a cavity located in said outer surface of said second outer stationary plate and step (c) includes the step of placing into abutting engagement a second surface of said second flat plate member with a portion of a second wall surface of said housing member adjacent said open end, said portion of said second wall surface of said housing member being disposed axially opposite said portion of said first wall surface of said housing member.

9. A method of reconditioning a worn friction clutch mechanism of a railway car draft gear assembly, according to claim 8, wherein said method includes the additional step of testing said useable capacity of a reconditioned draft gear assembly prior to shipping.

* * * * *